United States Patent
Nagler

[11] 3,830,588
[45] Aug. 20, 1974

[54] HELICOPTER ROTOR PLENUM CHAMBER

[75] Inventor: Bruno A. Nagler, Scottsdale, Ariz.

[73] Assignee: Nagler Aircraft Corporation, Phoenix, Ariz.

[22] Filed: Mar. 27, 1972

[21] Appl. No.: 238,393

[52] U.S. Cl.................... 416/20, 416/90, 416/148
[51] Int. Cl............................................ B64c 27/18
[58] Field of Search ............... 416/20, 102, 90, 148

[56] References Cited
UNITED STATES PATENTS

| | | | |
|---|---|---|---|
| 2,429,646 | 10/1947 | Pullin | 416/20 |
| 2,845,131 | 7/1958 | Laufer | 416/20 |
| 3,073,394 | 1/1963 | Laufer | 416/20 |
| 3,119,577 | 1/1964 | Andrews | 416/20 X |
| 3,159,360 | 12/1964 | Ryan et al. | 416/20 X |
| 3,370,809 | 2/1968 | Leoni | 416/20 X |
| 3,612,441 | 10/1971 | Abramopaulos | 416/20 UX |

FOREIGN PATENTS OR APPLICATIONS

| | | | |
|---|---|---|---|
| 1,002,007 | 10/1951 | France | 416/20 |
| 419,603 | 4/1947 | Italy | 416/20 |

Primary Examiner—Everette A. Powell, Jr.
Attorney, Agent, or Firm—Cahill, Sutton & Thomas

[57] ABSTRACT

A helicopter rotor hub is disclosed for transporting a flow of air from within the rotor to hollow sections within each of the rotor blades. A hollow rotor shaft, connected to an air compressor within the helicopter, conveys a flow of air through the rotor shaft to the rotor hub. The flow of air is discharged through a nozzle disposed at the trailing edge on the tip of the blade. The reaction force exerted by the discharging flow of air causes the rotor blade to rotate about the hub.

10 Claims, 8 Drawing Figures

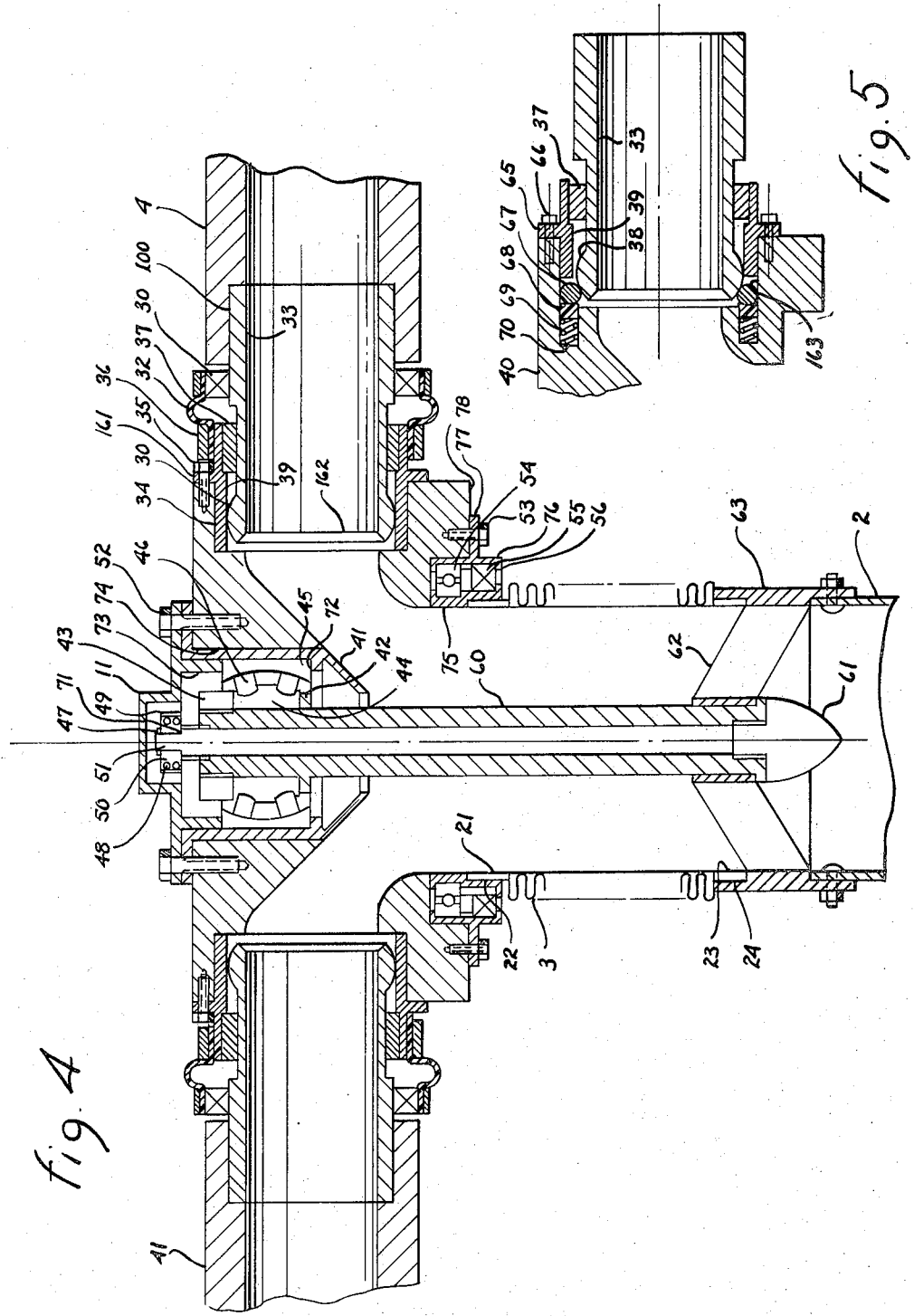

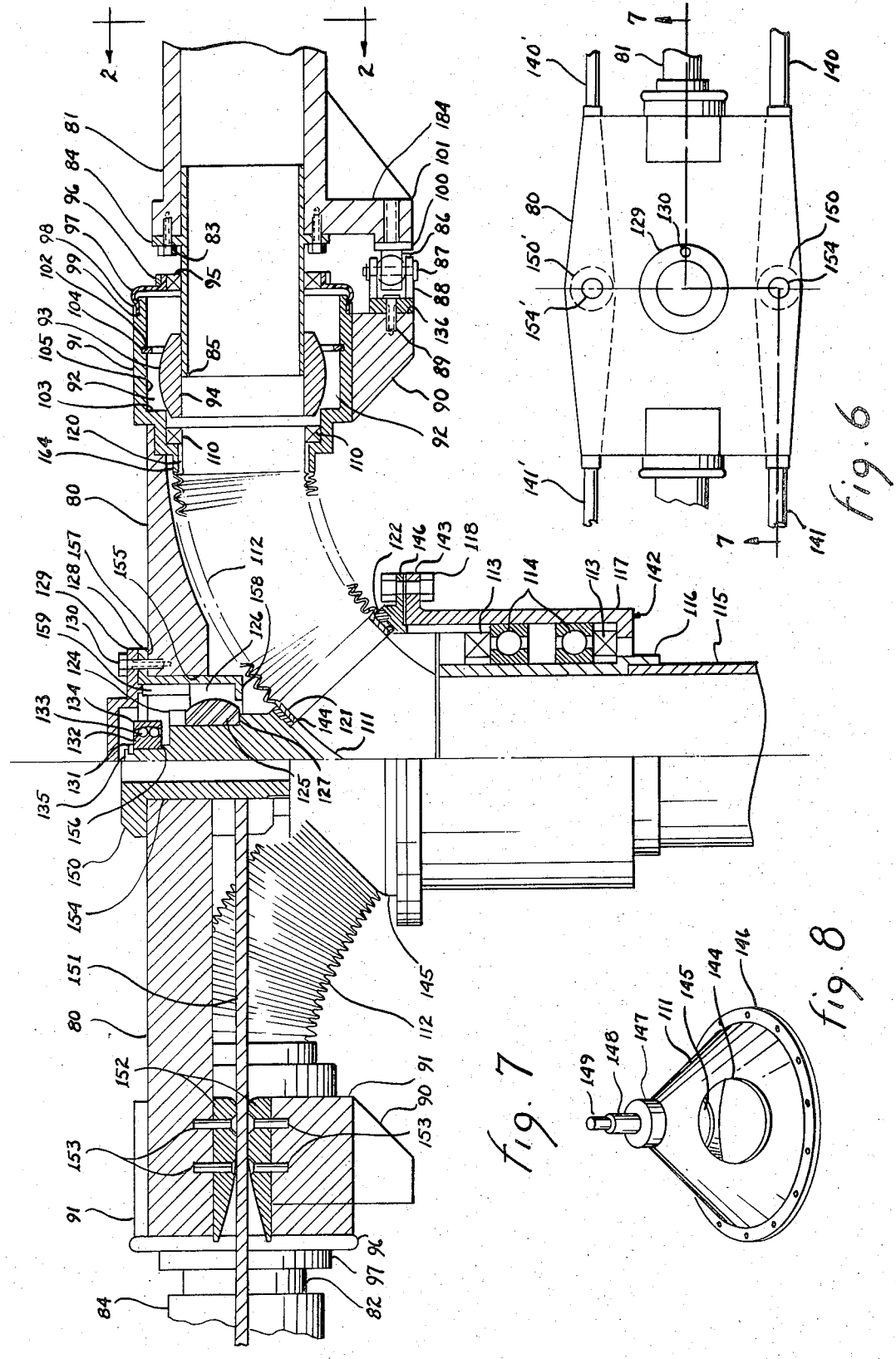

HELICOPTER ROTOR PLENUM CHAMBER

The present invention relates to power systems for helicopter rotors and, more particularly, to means for conveying a flow of air through a central hollow rotor shaft to the tips of each of the rotor blades.

Historically, the usual means for causing the rotor of a helicopter to rotate has been by connecting the rotor to an engine through some type of transmission means. A major drawback of this type of helicopter power system is that great loads are imposed upon the rotor structure. The vertical shaft connecting the rotor blades with the engine must be supported by massive structures in order to withstand the high torque loads. In addition, the hub design at the rotor must be such as to permit not only rotation but also angular movement of the hub with respect to the vertical rotor shaft to a predetermined number of degrees, usually ten degrees. Control for the rotor blades is effected through a swash plate at the hub, which swash plate is connected to the manual controls within the helicopter through a plurality of rods. These rods must be independent of the rotating vertical rotor. Necessarily, such an arrangement requires that each of the elements enumerated above be fully self-supporting because the control system cannot be mechanically connected to the rotating rotor and thereby provide an interaction to obtain the requisite structural strength.

Another disadvantage of the conventional power means is that of balance. Slight imbalances between various rotor blades cause the center of gravity of the rotor blades to be different from the axis of the rotating rotor. Such a shaft in the center of gravity places great structural loads upon the bearings supporting the rotating rotor. To compound this problem, it is practically impossible to support the rotating rotor at or very close to the hub itself. Thus, the rotating rotor must be of sufficient strength to withstand and not be deformed by a shifting or altered center of gravity. A further disadvantage of the conventional power means is that of the considerable number of transmission elements required to convert the power of the rotary engine to a rotating force on the rotor blades. Each one of these transmission elements dissipates a portion of the unavailable power due to friction losses.

In order to overcome the mechanical and structural problems associated with the conventional means for supplying power to a helicopter rotor blade, several divergent approaches have been attempted. An early approach was that of using a jet engine, or turbine, at the tip of each of the rotor blades. Such a system completely removed the structural requirements placed upon the vertical rotor shaft, as the rotor blades represented a simple rotating disc with its center at the vertical rotor shaft. The structural requirements thus placed on the vertical rotor shaft were minimum and well within feasible application. However, other problems were associated with this approach. The means for transporting fuel to each of the engines in correct flow rates presented a serious problem. The centrifugal force acting upon the fuel due to the rotating rotor blades changed, depending upon the speed of the blades, and thus caused the engines to run too rich or too lean with subsequent power failures. In addition, there were severe problems associated with conveying the fuel through the non-rotating rotor shaft and into the rotating rotor blade hub. The fuel used was, of course, extremely volatile and any leaks at the hub presented a severe safety hazard.

In order to take advantage of the structural requirements associated with the rotor blade acting as a simple rotating disc, without the attendant problems of conveying volatile fuel to the jet engines, a design emerged which utilized the flow of air to produce the force necessary to rotate the rotor blades. In this design, a flow of air was directed through the rotor blades to nozzles disposed at the tips of each of the rotor blades. These nozzles were directed rearwardly, whereby the discharge of air through the nozzle caused a reactive force in the opposite direction and rotated the blade about the hub. The problems associated with this type of power system was that of conveying the flow of air with a minimum of flow losses through the vertical rotor shaft, the hub, and the rotor blades themselves. The vertical rotor shaft design was relatively elementary, being simply a rigid hollow shaft. In the hub, the flow of air had to be directed through an angle of ninety degrees into the rotor blades. Unless the passage of the flow of air through an angle of 90° is streamlined, smooth and of maximum curvature, there occur substantial losses in pressure. One attempt at more efficiently directing the flow of air embraced a hollow spherically shaped member positioned between the hub and each blade. The member had sliding plates to permit angular displacement between the input and output to compensate for the angular movement between the hub and the rotor blades. The member necessarily had to be machined to close tolerances, and it had to be lubricated continuously to reduce friction losses. The lubricant also acted as a seal to prevent escape of a portion of the air. This method was feasible but left much to be desired. The cross sectional area of the flow of air through the vertical rotor shaft was necessarily substantially altered as the flow of air passed through the hub and into each of the rotor blades. Such changes in cross sectional area, as well as requirements for abrupt angular changes in the flow of air, caused substantial losses and reduced the effectiveness of this power system. In addition, the requirements for the oil sealing system required additional mechanical implementations to maintain oil pressure between the adjacent sliding members.

It is therefore a primary object of the present invention to provide a ducted air system for rotating a rotor blade.

Another object of the present invention is to provide a streamlined ducted air system for helicopter rotor blades.

A further object of the present invention is to provide a streamlined duct between an air compressor and a tip of a rotor blade.

A still further object of the present invention is to provide a flexible interconnecting duct between a vertical rotor shaft and each individual rotor blade.

Yet another object of the present invention is to provide a flexible duct interconnecting a hollow vertical rotor shaft and the hub assembly of the rotor blades.

Yet another object of the present invention is to provide a helicopter hub and vertical rotor shaft with an interconnecting flexible duct without subjecting the flexible duct to any structural strains or stresses.

In a first embodiment of the present invention, a flexible duct is positioned intermediate a hollow vertical rotor shaft and the hub of the rotor blades. A central post mechanically connects the hub to the hollow rotor shaft and thereby removes mechanical strain from the flexible duct. A central portion within the hub directs a flow of air from the hollow vertical rotor shaft to each of the rotor blades. The central portion is configured to smoothly direct the flow of air into the rotor blades to change the direction of the flow of air with a minimum amount of pressure loss. The flexible duct permits angular reorientation of the hub with respect to the vertical rotor shaft in order to satisfy the requisite control functions. The displacement of the flexible duct due to angular reorientation of the hub will not deleteriously affect the flow of air.

In a second embodiment of the present invention, a flexible duct is positioned intermediate the hub and each rotor blade. Thereby, a flow of air from a hollow vertical rotor shaft is ducted through the hub to each of the rotor blades. The flexible duct is in the form of a bellow, which bellow permits flexing of the rotor blade in more than one axis without adversely affecting the operation of the flexible duct.

The present invention may be understood with more specificity and clarity with reference to the following figures, in which:

FIG. 4 illustrates a cross section of a first preferred embodiment of the present invention.

FIG. 5 illustrates a cross section of a modification of the air flow seal shown in FIG. 4.

FIG. 6 illustrates a top view of the hub in a second embodiment of the present invention.

FIG. 7 illustrates a cross section of a second embodiment of the present invention, taken along lines 7–7' of FIG. 6.

FIG. 8 illustrates the central portion of the hub shown in FIG. 7.

Figure 1:
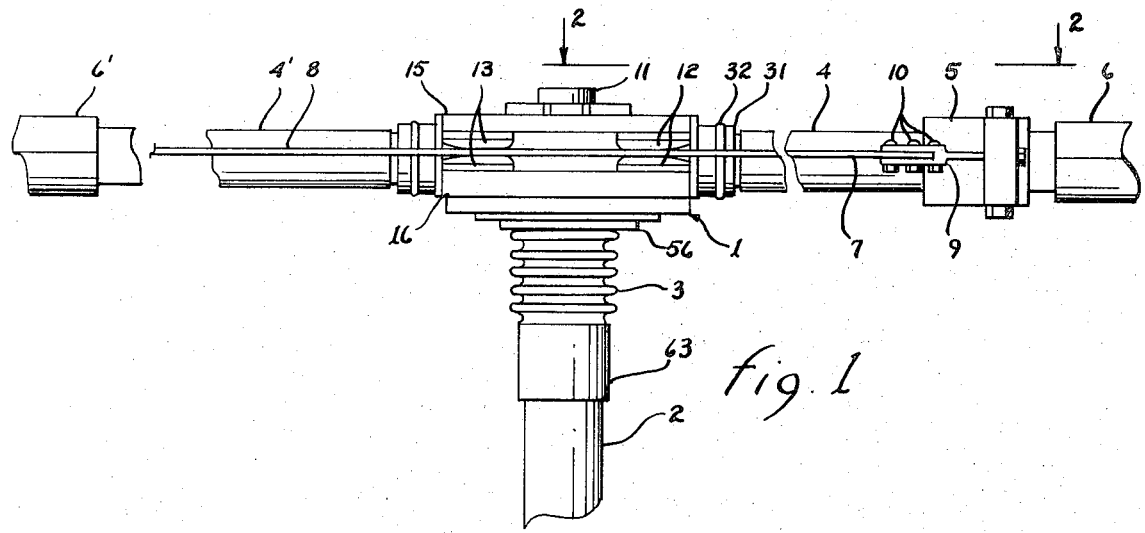
FIG. 1 illustrates a helicopter rotor hub incorporating the teachings of the present invention.

Referring to FIG. 1, there is shown an overall view of a first embodiment of the present invention. A hollow vertical rotor shaft 2 extends upwardly from the body of a helicopter (not shown). A collar 63 is secured to rotor shaft 2 and by internal members connects hub 1 to rotor shaft 2. A flexible bellow 3 is disposed between the collar 63 and hub 1. The prime function of hub 1 is to serve as a mounting platform for rotor blades 6 and 6' connected thereto through hollow blade shafts 4 and 4'.

In operation, a flow of air from a compressor within the body of the helicopter is ducted through hollow rotor shaft 2, through collar 63 and through bellows 3 into hub 1. Hub 1 includes a pair of passageways to provide a streamlined curved duct for conveying a portion of the flow of air from the vertical shaft 2 into each of the hollow blade shafts 4 and 4'. The blade shafts 4 and 4' further convey their respective portions of the flow of air into passageways within each of the blades 6 and 6'. The flow of air forced through each of the blades 6 and 6' discharges through nozzles located at the trailing edge of each of the respective blade tips. A reactive force generated by the discharge of air will cause the rotor blades 6 and 6' to rotate about the hub 1. The rotation of the rotor blades 6 and 6' about hub 1 generates lift due to the air foil cross section of each of the rotor blades, as is well known to those skilled in the helicopter art.

Figure 2:
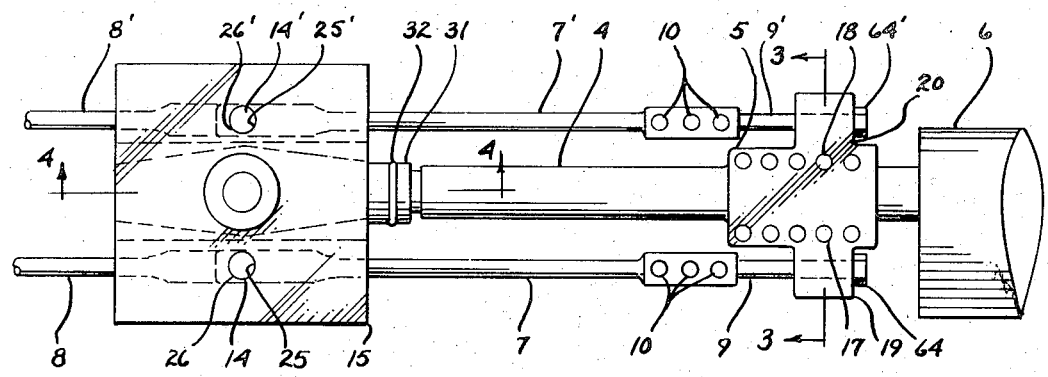
FIG. 2 illustrates a top view of one side of the rotor hub of the present invention.

FIG. 2 illustrates the means for securing each of the rotor blades 6 and 6' to the hub 1 without subjecting the hollow shafts 4 and 4' to mechanical stresses or strains. The hub 1 includes an upper plate 15 centrally mounted with respect to the axis of shaft 2. A similar plate 16 is disposed beneath plate 15. Two pairs of straps 7 and 7', which straps may be a plurality of adjacent steel leaves, are secured between plates 15 and 16 by a pair of bolts 14 and 14' extending through apertures 26 and 26' in each of plates 15 and 16 and apertures 25 and 25' in each of straps 7 and 7', respectively. Similarly, a second pair of straps 8 and 8' are connected between plates 15 and 16 for the other rotor blade 6' (see FIG. 1). If desired, the ends of straps 7, 8 and 7', 8' may be interleaved between plates 15 and 16 such that bolts 14 and 14' engage similar apertures 25 and 25' in the corresponding pairs of straps.

Figure 3:
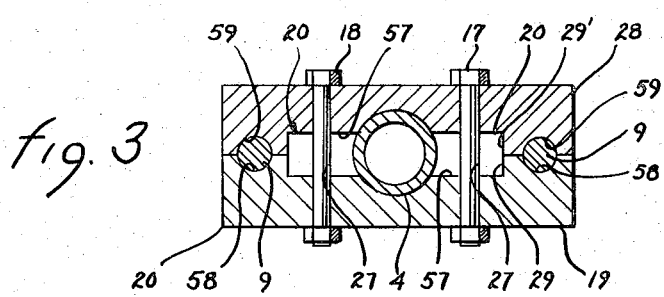
FIG. 3 illustrates a cross section of the attachment of the rotor blade to the hub to obtain the requisite structural strength.

As best shown in FIG. 3, each of the shafts (4 and 4') include a pair of diametrically opposed flanges 20 disposed in proximity to the extremity of shaft 4. Each of the flanges 20 includes a plurality of apertures 27 aligned with the axis of shaft 4. A pair of hold-down blocks 19 and 28 are mounted on either side of flanges 20. Each of these blocks, 19 and 28, includes a recess 57, which recess receives one-half of the cross sectional area of shaft 4 and flanges 20. Two sets of nut and bolt assemblies, 17 and 18, secure the blocks 19 and 28 to the shaft 4 and flanges 20. Each of the blocks 19 and 28 also include a pair of semi-cylindrical depressions 58 and 59. These pairs of depressions cooperate to define a circular aperture. After the blocks 19 and 28 are secured to the shaft 4, the shaft of one of a pair of forks 9 (see FIGS. 1 and 2) is inserted into each of the circular apertures formed by the pairs of depressions 58 and 59. The extremities of the straps 7 and 7' are secured between the tines of the fork 9 by a plurality of bolts 10 and 10', respectively. A pair of nuts 64 and 64' are threaded onto the shaft of fork 9 and prevent the form 9 from being pulled out of engagement with the blocks 19 and 28.

In operation, the centrifugal force acting upon the rotor blades 6 and 6' is transmitted through the blocks 19 and 28, the forks 9 and 9', straps 7 and 7', to bolts 14 and 14', securing straps 7 and 7' between plates 15 and 16. In this manner, the shafts 4 and 4' are subjected to a minimum, if any, centrifugal force acting upon rotor blades 6 and 6'.

In normal operation, there will be some vertical flexing of each of the rotor blades. To accommodate this expected fluctuation, a pair of guides 12 and 13 (see FIG. 1) are disposed between plates 15 and 16. These guides 12 and 13 are configured to clamp the respective straps 7 and 8. The outer end of the inner surface of each of the pairs of guides 12 and 13 contacting the straps 7 and 8 curve away from straps 7 and 8, which curve permits upward and downward flexing of the straps 7 and 8 in conformance with the vertical flexing of rotor blades 6 and 6'. The curved surfaces of the guides 12 and 13 provide a supporting surface for the straps 7 and 8 to limit the radius of curvature of the straps 7 and 8.

Referring to FIG. 4, there is shown a cross sectional view of the apparatus for ducting tHe flow of air through hub 1 of the first embodiment. The flow of air from an air compressor within the helicopter itself (not shown) is ducted through hollow rotor shaft 2. A collar 63 is secured to rotor shaft 2 at the extremity thereof. The collar 63 includes a plurality of inwardly extending struts 62. A tubular shaft 60 is attached to the inner extremities of each of the struts 62. In this manner, the shaft 60 is maintained in a rigid relationship with respect to the axis of rotor shaft 2. In order to disrupt the flow of air to a minimum extent, a streamlined end piece 61 is secured to the lower portion of shaft 60 facing the flow of air. The struts 62 are streamlined to provide a minimum resistance or disturbance to the air flow from shaft 2.

The upper end of shaft 60 includes an annular flange 42 which serves as a shoulder for the inner race 44 of a spherical bearing 46. A nut 43, threaded onto the shaft 60, secures the inner race 44 against flange 42. A stud 51 having a shoulder 71 is threaded within the upper hollow central portion of shaft 60 and extends upwardly therefrom. The inner race 50 of a spherical bearing 48 is seated against shoulder 71 and secured in position by a ring 47 cooperating with a groove disposed in proximity to the top of stud 51.

The central member 40, which ducts the flow of air from the rotor shaft 2 into each of the rotor blades, is secured to the rotor shaft 2 in the following manner. The member 40 includes a central hollow recess 74 for receiving insert 41. Insert 41 is a generally hollow cylindrical piece having an annular flange 72 disposed inwardly from the main portion of the insert 41. The outer race 45 of spherical bearing 46 seats against the inner cylindrical surface of insert 41 with flange 72 acting as a shoulder. A cap 11, including a downwardly extending cylindrical wall 73, is fitted onto the upper portion of insert 41. The circular wall 73 is configured to secure the outer race 45 against flange 72. With this means of attachment, the insert 41 may rotate in the vertical axis about shaft 60 and may rotate about the horizontal axis through the axis of the spherical bearing 46 to a limited degree depending upon the degree of freedom of spherical bearing 46. Thus, insert 41 has two axes of rotation about the upper extremity of shaft 60.

The central member 40 includes a central cylindrical recess 74 for receiving the insert 41. The insert 41 and cap 11 are secured to central member 40 by a plurality of bolts 52 extending through flanges of cap 11 and insert 41 and threadedly engaging central member. The bearing 48 includes an outer race 49. The outer race 49 will engage the inner surface of the raised central part of cap 11 at the extremity of pivotal movement of hub 1 and thereby limit the pivotal movement about a horizontal axis of hub 1. When the outer race 49 engages the inner surface of cap 11, there will be no frictional forces of any consequence between the rotating cap 11 and the non-rotating stud 51 as the outer race 49 will rotate about the inner race 50.

The central member 40 is a solid piece of metal machined to have a common air inlet port for receiving the flow of air from the rotor shaft 2 and dividing the flow of air into each of two outlet ports, each of the two ports corresponding with one of the hollow shafts 4, 4'. The air flow from rotor shaft 2 is redirected through an angle of 90°. Normally, such a redirection of a stream of air, if directed by sharp angular surfaces, produces large losses in air pressure. For this reason, the central portion 40 is configured to redirect the air in as streamlined a fashion as possible to minimize the air losses.

Collar 63 includes an annular inset 24 about the upper inner surface. A flexible bellows 3 includes a cylindrical end portion 23 which is seated within inset 24. The bellows 3 extends upwardly and terminates in a second cylindrical end portion 21. The cylindrical end portion 21 is seated within an annular inset 22 in housing 56. Housing 56 includes a stationery member 75 and a rotating member 76. The stationery member 75 has disposed therein the aforementioned inset 22. The stationery member 75 and rotating member 76 are attached to one another through bearing 54 and seal 55. In this manner, the rotating member 76 may rotate with respect to stationery member 75 through bearing 54 and yet there will be little, if any, air flow between the two members due to the seal 56 disposed therebetween.

Rotating member 76 includes an annular flange 77, extending outwardly therefrom. A plurality of bolts 53 secure flange 77 to the lower surface 78 of central member 40. By the above described apparatus, central member 40 may rotate with respect to rotor shaft 2 and yet maintain a relatively air tight seal between the rotating central member 40 and the stationary rotor shaft 2. The aforedescribed pivotal movement of central member 40 with respect to the horizontal axis of the spherical bearing 46 is possible, due to the flexing of flexible bellows 3, without subjecting the rotor shaft 2 to any unwanted disturbing horizontal forces.

The means for attaching the hollow blade shaft 4 to each of the outlet ports of central portion 40 will now be described. The hollow blade shaft 4 includes an inner annular recess 160. A cylinder 33 is press fitted within recess 160 and extends toward the hub 1 from shaft 4. A seal 30 is secured about the outer periphery of cylinder 33 in proximity to, but not contacting, the end of shaft 4. One side of a circular flexible seal 32 is secured to the outer periphery of seal 30 by a circular band or strap 31.

A cylindrical member 34, axially coincident with cylinder 33, is secured to the outlet port of central member 40 by a bolt 34 extending through flange 161 of member 34 and threadedly engaging central member 40. The other side of flexible seal 32 extends about a part of the periphery of member 34 and is secured thereto by band or strap 36. In this manner, the seal 32 inhibits dirt or other foreign matter within the atmosphere from coming into contact with the outer periphery of cylinder 33. Similarly, the combination of flexible seal 32 and seal 30 prevents escape of air from central member 40 intermediate the cylinder 33 and central member 40.

A compressible annular member 37 is disposed intermediate the outer surface of cylinder 33 and the inner surface of member 34 to maintain the desired alignment but permit movement therebetween. The outer surface of cylinder 33, in proximity to end 162 of cylinder 33, is configured as an arcuate section 38 transverse the axis of cylinder 33. The surface of arcuate section 38 contacts the inner surface of member 34 and acts as a pivot for the aligned cylinder 33, shaft 4, and the attached rotor blade 6. The axial length of the inner surface of member 34 allows a limited axial movement of section 38 therealong.

In this manner, the apparatus within hub 1 permits the aforementioned vertical angular movement of the rotor blade 6. Practical considerations dictate that there be a slight amount of play in the axial direction between central member 40 and the respective rotor blades. The above-described assembly permits such play along the axis of the shaft 4 toward and away from the central member 40 without causing damage or strain to the above-described assembly as the centrifugal force acting upon the rotor blade 6 and shaft 4 is countered by the straps 7 and 7'. Although not shown in FIG. 4, a droop stop similar to that described with respect to FIG. 7 may be incorporated in the apparatus shown in FIG. 4.

FIG. 5 illustrates a modification of the seal arrangement described with reference to FIG. 4. The cross sectional configuration of cylinder 33 remains the same. However, the configuration about the outlet port of central portion 40 is modified. In FIG. 5, the seal 30 and flexible seal 32 have been omitted. As a functional replacement, an annular cavity 70 is disposed about the outlet port of central portion 40. A coil spring 69 is disposed within a portion of cavity 70. Spring 69 acts against a piston 68, which piston may be in the shape of a ring having a rectangular cross sectional area. Adjacent the piston 68 is an O-ring 67. The cross sectional area of the O-ring 67 is dimensioned to be somewhat greater than the distance between the uppermost part of the arcuate section 38 and the outer surface 163 of cavity 70. In operation, the spring 69 exerts a force upon piston 68, tending to force piston 68 out of cavity 70. Piston 68, in turn, contacts O-ring 67 and tends to wedge O-ring 67 between arcuate surface 38 and outer surface 163. Thereby, the O-ring 67 effectively acts as a seal between arcuate surface 38 and outer surface 163. In this manner, a seal is effected between cylindrical member 33 and the central portion 40 to prevent a loss of air flow through the adjoining above-mentioned members. Necessarily, member 39 still provides a pivot surface for arcuate section 38 to permit the shaft 4 and the associated rotor blade to pivot in the vertical direction. A compressible member 37 is disposed between cylinder 33 and member 39 to prevent foreign matter from entering and frictionally or otherwise disturbing the pivotal movement of arcuate surface 38 against member 39. The member 39 also maintains alignment, but permits movement between cylinder 33 and member 39.

FIG. 6 illustrates a top view of a second embodiment of the present invention. A top plate 80 conforms in general plan form to the exterior dimensions of the hub 1 of the second embodiment. The plate 80 includes a pair of apertures 154 and 154' diametrically opposed to one another through the center of the plate 80. These apertures 154 and 154' receive a pair of posts 150 and 150'. The posts 150 and 150' also engage an aperture in each of the sets of straps 140, 141 and 140', 141' and thereby securely position one end of these straps. The other ends of these straps 140, 141 and 140', 141' are secured to the respective rotor blades in a manner similar to that described with respect to FIG. 2 above.

For the following discussion of the constructional features within the hub 1 of the second embodiment, particular reference will be made to FIGS. 7 and 8. The hollow vertical rotor shaft extending upwardly from the helicopter body is depicted as shaft 115. Shaft 115 conveys a flow of air from an air compressor, mounted within the body of the helicopter, into the hub 1 of the second embodiment. A member 142 is secured to the upper extremity of shaft 115. The member 142 includes several elements. One of the elements is a nonrotating cylinder 116 fitted to and secured about the extremity of shaft 115. A second cylindrical member 117 is operably connected to member 116 through a pair of ball bearing units 114 and a pair of seals 113 flanking the ball bearings 114. By this arrangement, member 117 may rotate with respect to member 116 and yet there will be little, if any, escape of air flow between members 116 and 117 due to seals 113.

Part of the function of the hub 1 of the second embodiment is that of distributing a portion of the air flowing into the hub to each of the rotor blades extending from the hub. This air distribution is accomplished by a central member shown in FIG. 8 and designated by the numeral 111. In essence, central member 111 comprises a hollow cone having diametrically opposed ports 144 and 145 at the side of the cone. A flange 146 extends perpendicularly to the axis of the cone from the outer periphery of the lower edge of the cone. A first shaft 147 extends vertically upwardly from the apex of the cone. A second shaft 148, concentric with first shaft 147, extends above shaft 147 followed by yet a third shaft 149 concentric with shaft 148 and extending upwardly from shaft 148. The interior dimensions of the central member 111 are configured to provide as streamlined a path as possible for the flow of air from the bottom of the cone through each of the outlet ports 144 and 145.

The central member 111 is connected to member 117 by a plurality of bolts 118 extending through flange 143 of member 117 and flange 146 of central member 111. By this arrangement, central member 111 may rotate with respect to the vertical rotor shaft 115 with relative freedom and hindered only by the friction associated with bearings 114 and seals 113.

A spherical bearing 125 is positioned about shaft 148 adjacent the shoulder 127 created by the larger diameter shaft 147. A nut 124 threaded onto shaft 148 secures bearing 125 to shoulder 127. The inner race 132 of bearing 133 is positioned about shaft 149 by forcing inner race 132 securely against shoulder 156 on shaft 149. A ring 131, fitting within an annular slot of shaft 149 secures the inner race 132 against shoulder 156.

The plate 80 includes a centrally disposed aperture 155. A generally hollow cylindrical member 128, which member includes a flange 157, is disposed within aperture 155 with the flange 157 resting against the top surface of plate 80. A cap 129 generally peripherally coincident with flange 128 is secured to member 128 and plate 80 by a plurality of bolts 130 extending through the cap 129, flange 128 and threadedly engaging plate 80. The outer race 126 of spherical bearing 125 is secured adjacent flange 158 of cylindrical member 128. The outer race 126 is held in position by ring 159 adjacent the inner surface of cylindrical member 128.

By the above-described apparatus for securing the shafts of central member 111 to plate 80, plate 80 has at least a limited angular movement about a horizontal axis extending through the center of spherical bearing 125. The degree of angular movement of plate 80 with respect to central member 111 is limited by practical considerations and the expected operational features requiring a specified angular movement. In practice, an angular movement of up to ten degrees freedom has been found to provide sufficient control for the helicopter operation. The angular freedom is limited by the outer race 134 of bearing 133. As the plate 80 approaches the maximum limit, such as ten degrees, the outer race 134 will contact the top or side inner surface of cap 129. When such contact is made, the plate 80 is inhibited from further angular movement. However, the contact between outer race 134 and the inner surface of cap 129 does not create a frictional engagement between the rotating cap 129 and the non-rotating shaft 149 because the outer race 134, normally non-rotating, will begin to rotate when contact is made with the cap 129. Because the bearing 133 is a relatively friction-free bearing, the frictional forces that are set up are considered to be deminimus.

As has been mentioned previously, each of the rotor blades will undergo angular movement in the vertical direction during the power on and power off modes of operation. In addition, the rotor blades and the hub will tilt with respect to the rotor shaft 115 for control purposes. In order to continue to duct a relatively smooth flow of air from within the vertical rotor shaft 115, to the central member 111, to the hollow blade shafts 81 and 82 and thence through the rotor blades themselves, a flexible duct must be inserted intermediate the central member 111 and the blade shafts 81 and 82. Such a duct is represented by flexible bellows 112. The bellows 112 includes an annular flange 121 disposed within a ring 122, the latter being fitted to central member 111.

A hollow cylindrical member 91 is attached to plate 80 and generally aligned with outlet port 144 of central member 111. The manner of securing member 91 to plate 80 may be by any one of several methods such as welding, bolting or a press fit. The bellows 112 includes a second annular flange 120 adjacent member 91. The flange 120 is fixed within the end 164 of member 91 and secured thereto by any one of several means well known to those skilled in the art. A seal 110 is disposed intermediate member 91 and flange 120 to prevent any loss of air flow between the surfaces of flange 120 and end 164.

A hollow cylinder 82 is secured within the inner end of hollow shaft 81 by an annular flange 84 extending adjacent the end of shaft 81. A plurality of bolts 83 secure annular flange 84 to shaft 81. A seal 95 is secured about the periphery of cylinder 82 inwardly from flange 84. A flexible seal 97 is secured about the periphery of seal 95 by a strap 96. The seal 97 is also secured to the outer surface of member 91 by a strap 98. In this manner, cylinder 82 may rotate for a given angular movement in the pitch axis of the rotor blade while maintaining a seal between cylinder 82 and a non-rotating member 91. The flexible seal 97 permits limited angular movement of cylinder 82 in the vertical axis without impinging upon or being restricted by member 91.

A large hollow spherical bearing 93 slidably engages the outer surface of cylinder 82 in proximity to end 85 of cylinder 82. The outer race 92 of spherical bearing 93 is positioned adjacent shoulder 103 of member 91 and the inner surface 105 of member 91. The outer race 92 is held in this position by a ring 103 seated within an annular groove 104 within member 91. Through this arrangement, cylinder 82 may rotate to a limited degree in both the vertical and horizontal axes, pivoting about the central point of spherical bearing 93. As the end 85 of cylinder 82 is slidably engaged within spherical bearing 93, some play is permissible in positioning the rotor blade with respect to hub 1. It will also be evident that the above-described system is directed toward providing necessary freedom of angular movement rather than providing the structural strength to counteract the centrifugal forces acting upon the rotor blade. The latter is achieved through the arrangement shown and described with respect to FIG. 6. Thus, the above-described arrangement permits the requisite rotor blade freedom for proper operation and control of the helicopter rotor system.

While a helicopter rotor blade system is rotating, the centrifugal forces acting upon the rotor blades will in effect maintain the rotor blades in an essentially horizontal position. This is true even though the rotor blades may be attempting to provide a large amount of lift. The exact relationship between the pitch axis of the rotor blade and the speed of rotation is determined and controlled by the control system of the helicopter. However, when the rotor blades are not in operation, they will droop downwardly from the hub. To prevent such drooping and the attendant safety hazards when rotation of the rotor blades is initiated, some means must be provided to limit the droop to a tolerable angle. A practical and simple method to obtain the limited angular droop may now be considered.

An extension 184 is provided at the inner lower portion of hollow shaft 81. For additional strength, a triangular brace 101 may be secured between extension 184 and hollow shaft 81. The face of extension 184 includes a stop 100. A similar extension 90 may extend downwardly from member 91 generally coincident with extension 184. A fork 88 is secured to face 136 of extension 90 by bolt 89. A ball bearing 86 is secured within the fork 80 by a nut and bolt assembly 87. In operation, the stop 10 engages the ball bearing 87 and thereby limits the droop of the hollow shaft 81 and attached rotor blade. The use of a ball bearing 87 permits relatively friction free angular movement of shaft 81 in the pitch axis of the rotor blade because the ball bearing 86 will roll along the stop 100 as shaft 81 is rotated. When the hub begins to turn, the centrifugal forces affecting the rotor blade will tend to lift the rotor blade and shaft 81 until they are generally horizontal. Such angular movement in the vertical direction will disengage ball bearing 86 from stop 100. Thus, while the rotor is rotating, the rotor blade may be rotated in the pitch axis without any frictional interference from the droop stop represented by ball bearing 86.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. In a helicopter having a body, a hollow rotor shaft extending upwardly from the body for supporting a set of rotor blades, which rotor blades include a longitudinally oriented cavity terminating in a rearwardly directed orifice, an air pressure source disposed within the body for conveying a flow of air through the hollow rotor shaft and rotor hub system, including a rotor hub, for transmitting the flow of air through the hollow rotor shaft into the longitudinal cavity of each of the rotor blades, said rotor hub system comprising:

A. support means concentrically secured within the hollow rotor shaft and extending upwardly therefrom for providing a structural connection between the hollow rotor shaft and said rotor hub;

B. pivot means secured to said support means for interconnecting said support means and said rotor hub to permit both rotation and angular movement therebetween, whereby said rotor hub is configured as a floating hub;

C. a flexible bellows circumscribing said support means and interconnecting the hollow rotor shaft and said rotor hub for directing the flow of air from within the hollow rotor shaft into said rotor hub to accommodate pivotal movement of said rotor hub without impeding the flow of air;

D. sealed bearing means disposed intermediate said flexible bellows and said rotor hub for accommodating the rotational movement between said rotor hub and the hollow rotor shaft;

E. porting means attached to said pivot means, said porting means being disposed within said rotor hub for distributing the flow of air from the hollow shaft and through said flexible bellows to the cavities within each of the rotor blades, said parting means including:

i. an inlet port having a cross-sectional configuration equivalent to the cross-sectional configuration of the hollow rotor shaft;

ii. an outlet port corresponding to each of the rotor blades and having a cross-sectional configuration equivalent to the cross-sectional configuration of the cavity within the respective rotor blades; and iii. a curved passageway interconnecting each of said outlet ports with said inlet port to minimize the pressure drop of the air flow through said porting means;

F. connecting means disposed intermediate said rotor hub and each of the rotor blades for securing the rotor blades to said rotor hub, said connecting means being adapted to provide for both pivotal and rotational movement between said rotor hub and each of the rotor blades; and G. ducting means disposed intermediate each of said inlet ports and the cavity of the corresponding one of the rotor blades for conveying a flow of air from said porting means into the cavity within each rotor blade, whereby the flow of air is conveyed from the air pressure source within the body of the helicopter to each of the rotor blades while permitting rotational and angular movement between the hollow rotor shaft and the rotor blades.

2. The system as set forth in claim 1 wherein said porting means comprises an inlet port and two diametrically opposed outlet ports.

3. The system as set forth in claim 2 wherein one end of said flexible bellows is secured about the extremity of the hollow rotor shaft and said sealed bearing means is attached to said porting means about said inlet port; whereby, said flexible bellows conveys the flow of air directly into said porting means from the hollow rotor shaft.

4. The system as set forth in claim 3 including a plurality of inwardly directed struts extending within the hollow rotor shaft and supporting said support means.

5. The system as set forth in claim 4 wherein said pivot means comprises a spherical bearing disposed intermediate said support means and said porting means.

6. The system as set forth in claim 5 wherein said ducting means comprises a cylinder fixedly attached within the cavity of each rotor blade and in alignment with the corresponding one of said inlet ports.

7. The system as set forth in claim 6 wherein the end of said cylinder engaging said rotor hub includes an arcuate member to accommodate pivotal movement of each rotor blade with respect to said rotor hub.

8. The system as set forth in claim 7 further including means for sealing the junction of said rotor hub and each one of said cylinders.

9. The system as set forth in claim 8 wherein said sealing means comprises an annular sealed bearing disposed about said cylinder and a flexible annular seal having a first edge secured to said sealed bearing and a second edge secured to said rotor hub.

10. The system as set forth in claim 8 wherein each said sealing means comprises:

a. an annular cavity disposed within said rotor hub about said outlet ports;

b. a spring disposed within said annular cavity;

c. an O-ring circumscribing said cylinder and positioned adjacent said arcuate member and said rotor hub; and d. a piston mounted within said annular cavity intermediate said spring and said O-ring for exerting a force upon said O-ring.

* * * * *